(12) United States Patent
Jansen et al.

(10) Patent No.: US 9,187,078 B2
(45) Date of Patent: Nov. 17, 2015

(54) VEHICLE HAVING A RECUPERATION SYSTEM

(71) Applicants: Sebastian Jansen, Ludwigsburg (DE); Detlev Straub, Stuttgart (DE); Juergen Gross, Stuttgart (DE)

(72) Inventors: Sebastian Jansen, Ludwigsburg (DE); Detlev Straub, Stuttgart (DE); Juergen Gross, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 78 days.

(21) Appl. No.: 13/901,975

(22) Filed: May 24, 2013

(65) Prior Publication Data

US 2013/0316873 A1    Nov. 28, 2013

(30) Foreign Application Priority Data

May 25, 2012    (DE) .......................... 10 2012 208 845

(51) Int. Cl.

| | |
|---|---|
| *B60W 10/06* | (2006.01) |
| *B60W 10/08* | (2006.01) |
| *B60W 10/11* | (2012.01) |
| *B60K 6/485* | (2007.10) |
| *B60W 30/18* | (2012.01) |
| *B60W 20/00* | (2006.01) |

(52) U.S. Cl.
CPC ............... *B60W 10/08* (2013.01); *B60K 6/485* (2013.01); *B60W 10/06* (2013.01); *B60W 10/11* (2013.01); *B60W 20/1062* (2013.01); *B60W 20/30* (2013.01); *B60W 30/18127* (2013.01); *Y02T 10/6226* (2013.01); *Y02T 10/92* (2013.01); *Y10T 477/68* (2015.01)

(58) Field of Classification Search
None
See application file for complete search history.

(56) References Cited

U.S. PATENT DOCUMENTS

| | | | | |
|---|---|---|---|---|
| 5,031,479 | A | * | 7/1991 | Ibamoto et al. ............... 477/110 |
| 6,019,698 | A | * | 2/2000 | Lawrie et al. ..................... 477/5 |
| 8,386,140 | B2 | * | 2/2013 | Tsuda et al. ..................... 701/60 |
| 2003/0052650 | A1 | * | 3/2003 | Gunji ............................. 320/155 |
| 2008/0214352 | A1 | * | 9/2008 | Ebner et al. ....................... 477/4 |
| 2010/0197452 | A1 | * | 8/2010 | Kaltenbach et al. ............ 477/14 |
| 2010/0210410 | A1 | * | 8/2010 | Kaltenbach et al. .............. 477/3 |
| 2010/0275890 | A1 | * | 11/2010 | McDonald-Walker ....... 123/564 |

FOREIGN PATENT DOCUMENTS

| | | | |
|---|---|---|---|
| DE | 19528628 A1 | * | 2/1997 |
| DE | 103 11 885 | | 10/2003 |
| DE | 11 2006 001 313 | | 6/2008 |
| DE | 10 2010 031 905 | | 4/2011 |
| GB | 2386932 A | * | 10/2003 |

OTHER PUBLICATIONS

Machine translation of DE 19528628 A1.*

* cited by examiner

*Primary Examiner* — Edwin A Young
(74) *Attorney, Agent, or Firm* — Kenyon & Kenyon LLP

(57) ABSTRACT

A vehicle having an internal combustion engine, a transmission having multiple gears and a transmission input shaft, and a recuperation system for recovering electrical energy, the recuperation system being configured for changing a speed value of the internal combustion engine during a gear change from an actual gear into a setpoint gear to a speed value of the transmission input shaft in the setpoint gear.

15 Claims, 3 Drawing Sheets

VEHICLE HAVING A RECUPERATION SYSTEM

RELATED APPLICATION INFORMATION

The present application claims priority to and the benefit of German patent application no. 10 2012 208 845.8, which was filed in Germany on May 25, 2012, the disclosure of which is incorporated herein by reference.

FIELD OF THE INVENTION

The present invention relates to vehicles having recuperation systems and to hybrid vehicles, in which the rotor of the electric machine is connected to the crankshaft of the internal combustion engine via a mechanical transfer element.

BACKGROUND INFORMATION

Vehicles having an internal combustion engine may be equipped with a recuperation system, which in connection with an electrical storage (battery) allows a recovery of excess kinetic energy. For this purpose, an electric machine is operated in generator mode when the brake pedal is operated, so that kinetic energy of the vehicle is converted into electrical energy and stored in the battery. Excess kinetic energy also occurs in the vehicle during switching operations, when switching from a lower gear to a higher gear. In the engaged state, the crankshaft speed of the internal combustion engine corresponds to the speed of the transmission input shaft. When shifting into a higher gear, the speed of the transmission input shaft is reduced consistent with the change of the transmission ratio. The speeds of the internal combustion engine and of the transmission input shaft are synchronized presently after the switching operation by the clutch engagement, a certain proportion of the kinetic energy always being lost as frictional energy.

SUMMARY OF THE INVENTION

An underlying object of the exemplary embodiments and/or exemplary methods of the present invention is to improve a gear change in a vehicle.

This objective may be achieved by objects having the features according to the descriptions herein. Advantageous specific embodiments of the present invention are the subject of the figures, the description and the further descriptions herein.

The exemplary embodiments and/or exemplary methods of the present invention are based on the understanding that it is advantageous to adapt the speed of an internal combustion engine when gears are changed.

According to one aspect, the object according to the exemplary embodiments and/or exemplary methods of the present invention is achieved by a vehicle having an internal combustion engine, a transmission having multiple gears and a transmission input shaft, and a recuperation system for recovering electrical energy, the recuperation system being configured for changing a speed value of the internal combustion engine during a gear change from an actual gear into a setpoint gear to a speed value of the transmission input shaft in the setpoint gear. This, for example, achieves the technical advantage that smooth clutch engagement is made possible, the driving comfort is increased and the clutch wear is reduced.

In one advantageous specific embodiment, the recuperation system is configured for determining the setpoint gear and a transmission ratio of the setpoint gear. This results in, for example, the technical advantage that the wear of a clutch is even further reduced.

In another advantageous specific embodiment, the recuperation system is configured for determining a speed of the transmission input shaft in the setpoint gear. This results in, for example, the technical advantage that the speeds are synchronized in a particularly exact way.

In another advantageous specific embodiment, the recuperation system is configured for determining an instantaneous speed of the internal combustion engine. This results in, for example, the technical advantage that the instantaneous speed of the internal combustion engine may be considered in controlling the recuperation system.

In another advantageous specific embodiment, the recuperation system is configured for determining a speed of the vehicle. This results in, for example, the technical advantage that the speed of the transmission input shaft may be ascertained based on a speed of the vehicle and a transmission ratio.

In another advantageous specific embodiment, the recuperation system has a memory for storing transmission ratios. This results in, for example, the technical advantage that it is possible to store the data used for the transmission ratios.

In another advantageous specific embodiment, the recuperation system includes an electric machine. This results in, for example, the technical advantage that the electric machine may be used for the motorized drive of the internal combustion engine as well as for generating electrical energy in generator mode.

In another advantageous specific embodiment, the electric machine is configured for reducing the speed of the internal combustion engine when the electric machine is operated in generator mode. This results in, for example, the technical advantage that electrical energy is obtained from the movement of the internal combustion engine when upshifting.

In another advantageous specific embodiment, the electric machine is configured for increasing the speed of the internal combustion engine when the electric machine is operated as a motor. This results in, for example, the technical advantage that the internal combustion engine is driven with the electric machine, so that a clutch operation proceeds more softly when downshifting.

According to another aspect, the object according to the present invention is achieved by a method for operating a vehicle having an internal combustion engine, a transmission having multiple gears and a transmission input shaft, and a recuperation system for recovering electrical energy, having the step of a change of a speed value of the internal combustion engine during a gear change from an actual gear into a setpoint gear to a speed value of the transmission input shaft in the setpoint gear. This, for example, also achieves the technical advantage that smooth clutch engagement is made possible, the driving comfort is increased and the clutch wear is reduced.

In another advantageous specific embodiment, the method includes the step of determining the setpoint gear and a transmission ratio of the setpoint gear.

In another advantageous specific embodiment, the method includes the step of determining a speed of the transmission input shaft in the setpoint gear.

In another advantageous specific embodiment, the method includes the step of determining the instantaneous speed of the internal combustion engine.

In another advantageous specific embodiment, the method includes the step of determining a speed of the vehicle.

In another advantageous specific embodiment, the method includes the step of reducing the speed of the internal combustion engine when the recuperation system is operated in generator mode.

These method steps achieve technical advantages which correspond to those of each of the specific embodiments of the vehicle described above.

Exemplary specific embodiments of the invention are depicted in the drawings and will be explained in greater detail in the following.

DETAILED DESCRIPTION

Figure 1:
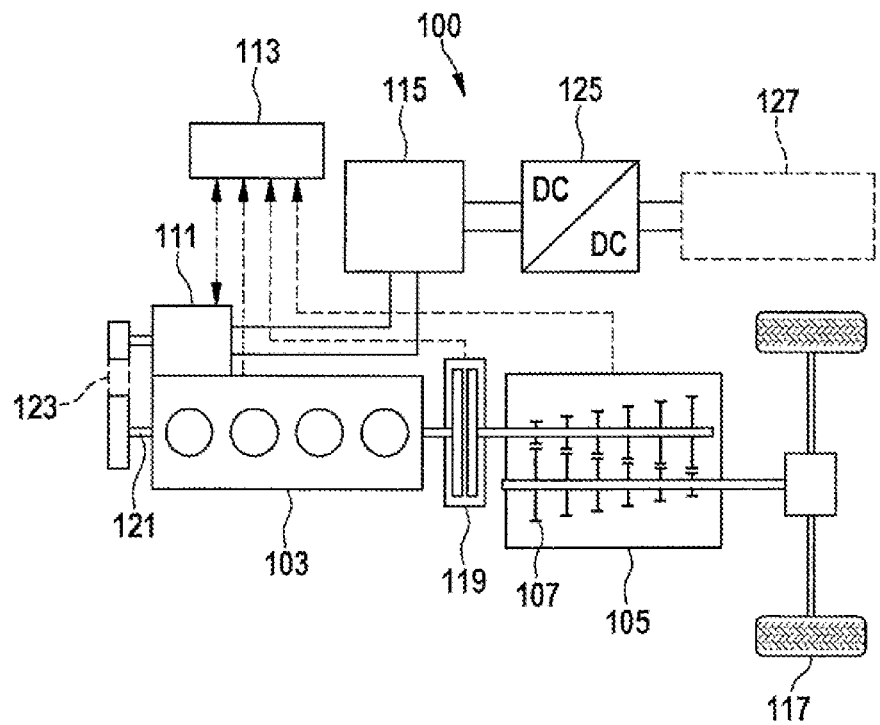
FIG. 1 shows a schematic view of a vehicle according to the present invention.

FIG. 1 shows a schematic representation of a vehicle 100 having a recuperation system 111, 113, 115. Electric machine 111 of the recuperation system, such as, for example, an induction machine, is connected to crankshaft 121 of internal combustion engine 103 via a mechanical transfer element 123, such as, for example, a belt drive. Internal combustion engine 103 is a heat engine, which converts chemical energy of a fuel by combustion into mechanical work. The combustion takes place in a combustion chamber in which a mixture of fuel and ambient air is ignited. The thermal expansion of the gas heated by combustion is used to move a piston.

During braking, the recuperation system recovers the kinetic energy as electrical energy. This is generally accomplished by operating electric machine 111 as a generator (in generator mode). The mechanical input power of electric machine 111 causes a braking effect, while electrical energy is recovered at the same time.

According to the exemplary embodiments and/or exemplary methods of the present invention, crankshaft 121 of internal combustion engine 103 may be operated both as a generator and as a motor by a control unit 113 and electric machine 111, and for this purpose is connected to an electrical energy storage 115, such as, for example, a 48-V battery. Electric machine 111 is thus able to reduce the speed of crankshaft 121 when operated in generator mode and to increase the speed when operated as a motor.

Internal combustion engine 103 is mechanically separably connected to a transmission 105 of vehicle 100 via a clutch 119. Transmission 105 includes multiple gears 107, which may be selected during operation of vehicle 100. The gears define a gear ratio between transmission input shaft 109 and a drive shaft. Via the drive shaft and wheels 117, the torque generated by internal combustion engine 103 is transferred to the road.

Energy storage 115 is used for driving electric machine 111 and also for storing electrical energy, which is generated by electric machine 111. Moreover, energy storage 115 may be connected to a 12-V vehicle electrical system 127 having a starter battery and other electrical loads via a DC-DC converter 125.

One object of the exemplary embodiments and/or exemplary methods of the present invention is to reduce the energy losses during gear changes, and thus to reduce the fuel consumption of vehicle 100 and its $CO_2$ emissions. The reduction of the energy losses during gear changes is achieved according to the present invention in that electric machine 111 is operated in generator mode during the switching operation with a disengaged clutch 119. This applies a decelerating torque to crankshaft 121, which reduces the crankshaft speed of internal combustion engine 103 to the extent that the crankshaft speed corresponds to the speed of transmission input shaft 109 when the clutch is engaged after the gear change.

The kinetic energy stored in the movable parts of internal combustion engine 103 is converted into electrical energy. The thus obtained electrical energy may be stored in battery 115 and utilized for supplying electrical consumers 127. The synchronization of the speeds of internal combustion engine 103 and transmission input shaft 109 is thus implemented not by friction in clutch 119, but instead by a power generation of electric machine 111. This minimizes the friction losses when engaging the clutch. This operation of electric machine 111 reduces energy losses during switching, the fuel consumption and the $CO_2$ emissions.

In another operation of electric machine 111, it is operated as a motor during a switching operation, i.e., during switching from a higher to a lower gear, so that the speed of internal combustion engine 103 is increased to the speed of transmission input shaft 109.

The exemplary embodiments and/or exemplary methods of the present invention generally increase the driving comfort and reduces clutch wear. This objective is achieved by synchronizing the speeds, resulting in less of a jolt when engaging the clutch. Moreover, clutch wear is reduced because the speeds are already synchronized when engaging the clutch and there are no friction losses. The exemplary embodiments and/or exemplary methods of the present invention are suitable in particular for use in a (boost) recuperation system (BRS).

Figure 2:
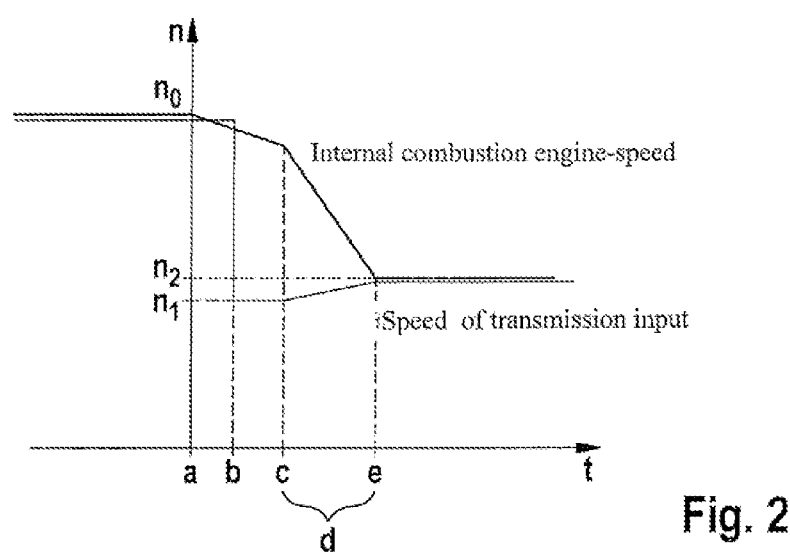
FIG. 2 shows a curve of rotational speeds during a switching operation.

FIG. 2 schematically shows the speed curves of internal combustion engine 103 on crankshaft 121 and transmission input shaft 109 during a switching operation, including a shift to a higher gear without influencing the recuperation system.

After the clutch is disengaged at point in time a), speed $n_0$ of internal combustion engine 103 drops. The force of the deceleration is determined by the inertia of internal combustion engine 103 and the engine friction. At point in time b), higher gear 107 is engaged in transmission 105, so that the speed of transmission input shaft 109 changes to $n_1$. The gear shift into higher gear 107 has the consequence that the speed of transmission input shaft 109 drops abruptly at a constant vehicle speed. The clutch engagement begins at point in time c). This causes the speeds of internal combustion engine 103 and transmission input shaft 109 to adapt with a slipping clutch 119 during time period d). This process is completed at point in time e) at speed $n_2$, from which point in time the speeds of crankshaft 121 and transmission input shaft 109 are synchronized. During the switching operation, energy losses occur due to a friction of internal combustion engine 103 and the friction torque of slipping clutch 119, which result in wear of clutch 119.

To reduce these energy losses, operation of the electric machine in generator mode may be provided when clutch 119 is disengaged. Operation in generator mode causes a deceleration of the speed of internal combustion engine 103, so that this speed corresponds to the speed of transmission input shaft 109 immediately before the engagement of the clutch. The synchronized speeds ensure that no friction losses occur in the clutch when it is engaged.

Figure 3:
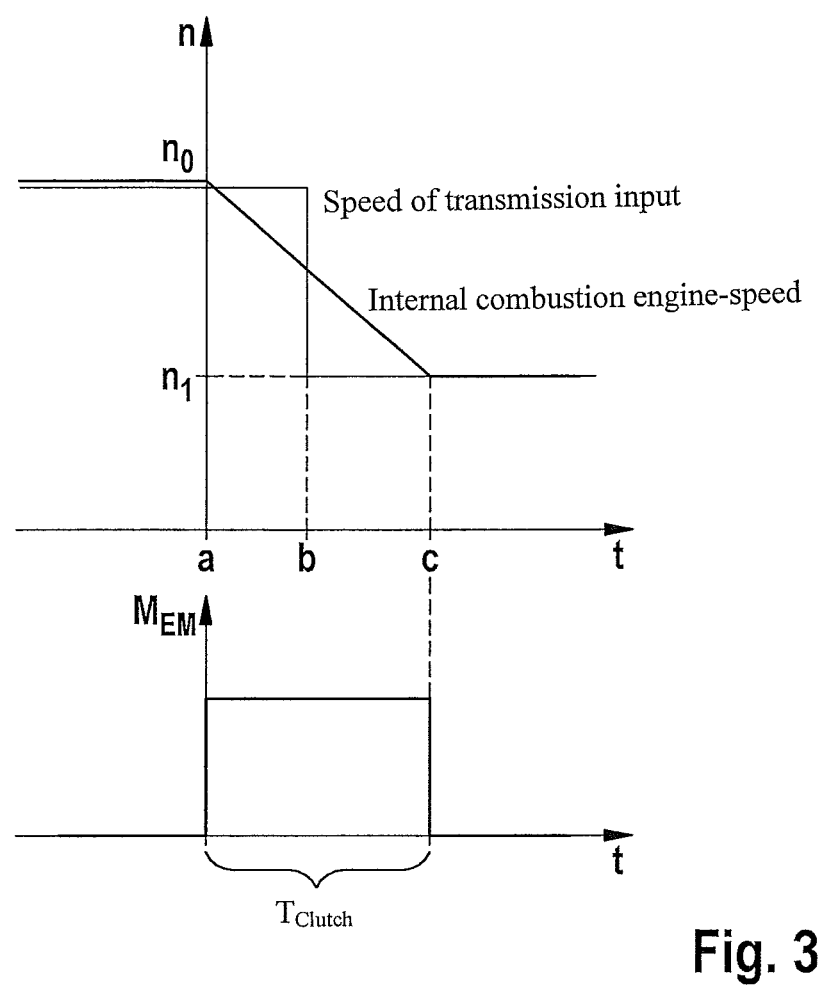
FIG. 3 shows a further curve of rotational speeds during a switching operation.

FIG. 3 schematically shows the corresponding speed curves and an associated exemplary curve of the generator torque applied by electric machine 111. Immediately after the disengagement, at speed $n_0$ ($\omega_0$) at t=0, electric machine 111 operates in generator mode and thus applies a decelerating torque to crankshaft 121. Parallel to the gear change at time b), the engine speed is thus reduced by recuperation to a new speed $n_1$ of transmission input shaft 109 during a period $T_{clutch}$, in which clutch 119 is operated.

This reduces the speed of internal combustion engine 103 significantly faster than solely by the engine drag torque. The kinetic energy stored in the moving parts is converted by electric machine 111 into electrical energy, which is stored in the 48-V battery and is available for the power supply of electrical consumers in vehicle electrical system 127. At point in time c), at which the speeds of transmission input shaft 109 and crankshaft 121 are synchronized, internal combustion engine 103 is engaged.

Figure 4:
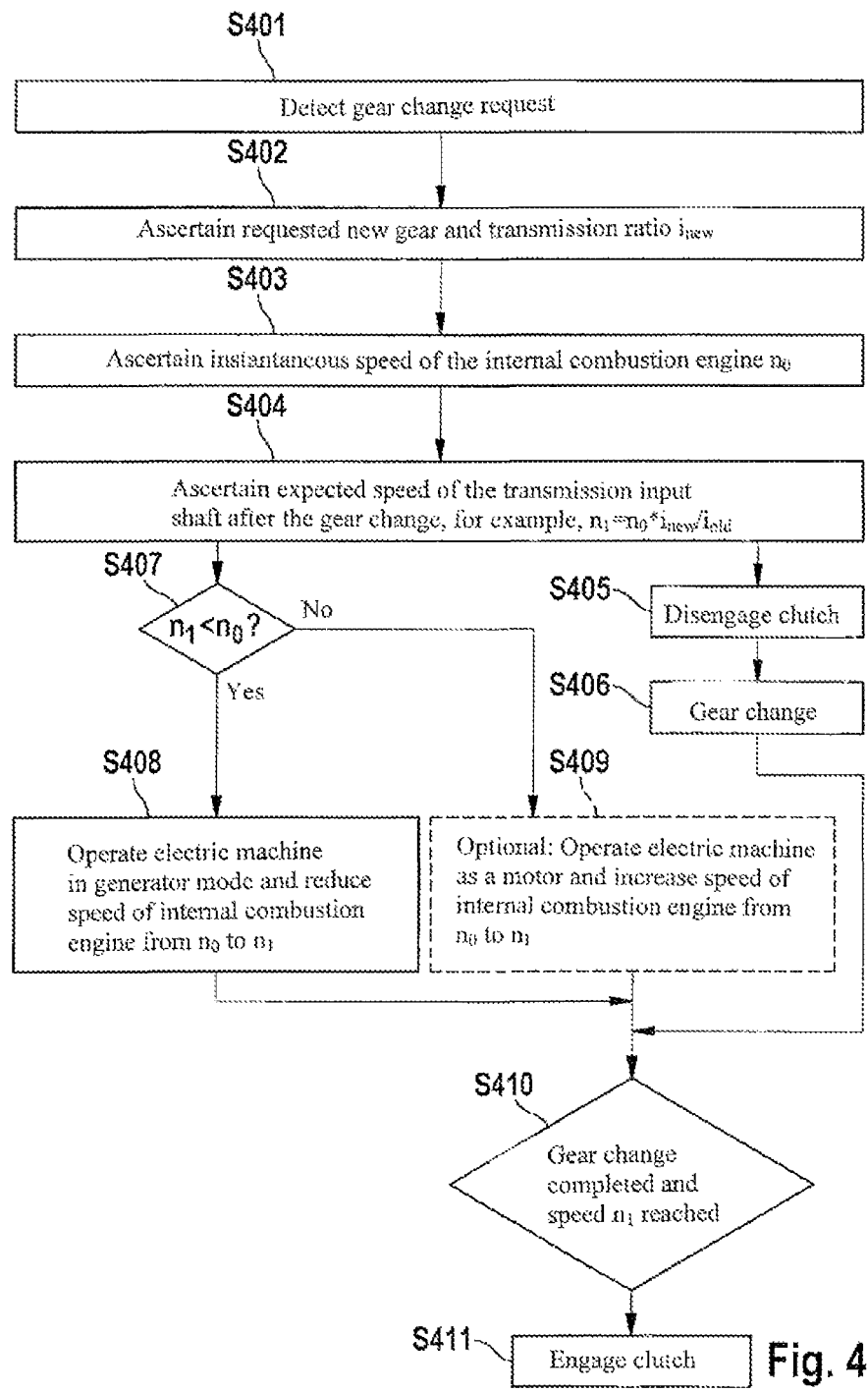
FIG. 4 shows a block diagram of the method according to the present invention.

FIG. 4 shows a flow chart for the control according to the present invention of the electric machine when changing gears.

The starting point is the detection of the request for a change of gears from an actual gear into a setpoint gear by the control of the system in step S401. In the case of automatic transmissions, a corresponding signal as well as the new gear may be provided by the transmission control even before the switching operation. In the case of manual transmissions, an impending switching operation is detected as a result of operating the clutch pedal. The action probably intended by the driver (upshifting or downshifting) may in many cases be predicted with high reliability even before the operation of the shift lever as a result of an evaluation of the engine speed and load, so that the activation of the electric machine may begin even before the actual gear change immediately after the clutch is disengaged.

The new gear actually engaged and its transmission ratio $i_{new}$ are ascertained no later than after the operation of the shift lever in step S402. For this purpose, appropriate sensors are provided in transmission 105. Subsequently, instantaneous speed $n_0$ of internal combustion engine 103 is ascertained in step S403.

From the instantaneous speed of the internal combustion engine as well as from the old and the new transmission ratios, probable setpoint speed $n_1$ of transmission input shaft 109 is calculated in step S404 after the gear change. In step S405, clutch 119 is disengaged, so that the two shafts are separated from one another. During the disengaged period of clutch 119, new gear 107 is engaged in step S406.

Simultaneously, starting speed $n_0$ and setpoint speed $n_1$ are compared with one another in step S407. If this setpoint speed $n_1$ is lower than starting speed $n_0$, electric machine 111 is operated in generator mode in step S408. The speed of the internal combustion engine is reduced in such a way that it corresponds to speed $n_1$ at the point in time of the clutch engagement.

If setpoint speed $n_1$ is higher than starting speed $n_0$, electric machine 111 may optionally be operated as a motor in step S409, in order to accelerate the speed of internal combustion engine 103 to the speed of transmission input shaft 109. In this connection, electrical energy from energy storage 115 is used for speed synchronization in order to achieve a smooth clutch engagement, thereby increasing the driving comfort and reducing clutch wear.

In step S410, it is checked whether the gear change has been completed and speed $n_1$ of internal combustion engine 103 has been reached. If this is the case, the clutch is engaged in step S411.

In another specific embodiment, a speed sensor may also be situated on transmission input shaft 109, the speed sensor determining the speed of the transmission input shaft after a gear change, so that the speed of internal combustion engine 103 may be adapted after the gear change to the speed ascertained by the speed sensor.

All individual features explained in the description and shown in the drawings may be combined with each other in any meaningful way in order to implement the advantageous effects together.

What is claimed is:

1. A vehicle, comprising:
    an internal combustion engine;
    a transmission having multiple gears and a transmission input shaft;
    an electrical energy storage; and
    a recuperation system for recovering electrical energy, wherein:
        the recuperation system includes an electric machine and is configured for synchronizing a speed value of the internal combustion engine during gear changes from an actual gear into a setpoint gear having a speed value of the transmission input shaft in the setpoint gear, the gear changes including a first gear change transitioning to a higher gear and a second gear change transitioning to a lower gear;
        during the first gear change, the electrical energy storage is configured to store electrical energy that had been converted by the electric machine from kinetic energy stored in the internal combustion engine; and
        during the second gear change, the electrical energy storage is configured to power the electric machine, thereby driving the internal combustion engine.

2. The vehicle of claim 1, wherein the recuperation system is configured for determining the setpoint gear and a gear ratio of the setpoint gear.

3. The vehicle of claim 1, wherein the recuperation system is configured for determining the speed value of the transmission input shaft in the setpoint gear.

4. The vehicle of claim 1, wherein the recuperation system is configured for determining an instantaneous speed of the internal combustion engine.

5. The vehicle of claim 1, wherein the recuperation system is configured for determining a speed of the vehicle.

6. The vehicle of claim 1, wherein the recuperation system has a memory for storing transmission ratios.

7. The vehicle of claim 1, wherein the electric machine is configured for reducing the speed value of the internal combustion engine when the electric machine is operated in generator mode.

8. The vehicle of claim 1, wherein the electric machine is configured for increasing the speed value of the internal combustion engine when the electric machine is operated as a motor.

9. A method for operating a vehicle having an internal combustion engine, a transmission having multiple gears and a transmission input shaft, and a recuperation system for recovering electrical energy, the recuperation system including an electrical energy storage and an electrical machine, the method comprising:
    synchronizing a speed value of the internal combustion engine during gear changes from an actual gear into a setpoint gear at a speed value of the transmission input shaft in the setpoint gear, the gear changes including a first gear change transitioning to a higher gear and a second gear change transitioning to a lower gear;
    storing, by the electrical energy storage and during the first gear change, electrical energy that had been converted by the electric machine from kinetic energy stored in the internal combustion engine; and during the second gear change, powering, by the electrical energy storage, the electric machine to drive the internal combustion engine.

10. The method of claim 9, further comprising:
determining the setpoint gear and a gear ratio of the setpoint gear.

11. The method of claim 9, further comprising:
determining the speed value of the transmission input shaft in the setpoint gear.

12. The method of claim 9, further comprising:
determining the instantaneous speed of the internal combustion engine.

13. The method of claim 9, further comprising:
determining a speed of the vehicle.

14. The method of claim 9, further comprising:
reducing the speed value of the internal combustion engine when the recuperation system is operated in generator mode.

15. The method of claim 9, further comprising:
increasing the speed value of the internal combustion engine when the electrical machine is operated as a motor.

* * * * *